United States Patent

Scott et al.

[11] Patent Number: 6,134,951
[45] Date of Patent: Oct. 24, 2000

[54] METHOD AND APPARATUS FOR DETERMINING THE WATER CONTENT OF AN OIL STREAM

[76] Inventors: Jeff Earl Scott, 132 Rosery Dr. N.W., Calgary, Canada, T2K 1L3; Travis H. Wolfe, 911 Parkvalley Way S.E., Calgary, Canada, T2J 4W1; Graham MacPherson, 51 Millside Way S.W., Calgary, Canada, T2Y 2R4

[21] Appl. No.: 09/133,835

[22] Filed: Aug. 13, 1998

[30] Foreign Application Priority Data

May 29, 1998 [CA] Canada ................................... 2239202

[51] Int. Cl.⁷ .............................. G01F 13/00; E21B 47/00
[52] U.S. Cl. ........................................ 73/61.44; 73/861.04
[58] Field of Search .................................. 73/61.44, 19.1, 73/19.12, 61.43, 61.77, 64.56, 861.04; 45/254, 258; 96/185, 182, 218; 208/187; 210/180, 182, 188

[56] References Cited

U.S. PATENT DOCUMENTS

| | | |
|---|---|---|
| 3,003,106 | 10/1961 | Vesper et al. . |
| 3,119,674 | 1/1964 | Glasgow et al. . |
| 3,616,399 | 10/1971 | Smith . |
| 4,059,987 | 11/1977 | Dowling et al. . |
| 4,215,567 | 8/1980 | Vlcek . |
| 4,429,581 | 2/1984 | Furmaga ........................... 73/861.04 |
| 4,596,136 | 6/1986 | Zacharias . |
| 4,656,869 | 4/1987 | Zacharias ................................. 73/597 |

*Primary Examiner*—Hezron Williams
*Assistant Examiner*—Michael Cygan
*Attorney, Agent, or Firm*—Bereskin & Parr

[57] ABSTRACT

At least the water content of an oil stream from a production oil well is determined by measuring the mass flow of the oil stream while the stream is under backpressure, diverting a known sample portion of the stream to a separator vessel, separating the sample into oil, gas and water fractions and measuring the relative flows of the fractions. The measured amounts are then used to calculate the oil, gas and water content of the main oil stream.

4 Claims, 4 Drawing Sheets

METHOD AND APPARATUS FOR DETERMINING THE WATER CONTENT OF AN OIL STREAM

FIELD OF THE INVENTION

This invention relates generally to oil well testing, and is concerned more particularly with a method and apparatus for determining at least the water content of an oil stream, for example a stream from one or more production wells.

BACKGROUND OF THE INVENTION

In order to optimize oil production from one or more oil wells, on-line measurement of at least the water content of the oil stream is required. Lighter oils can easily be separated from the water, and the oil can be assumed to be 100% oil and the water 100% water. However, these assumptions are not valid for heavier oils because the oil tends to emulsify in the water. So-called "test separators" therefore are used to separate the oil, water and any gas and measure the water content, for example using capacitance or RF admittance probes or conductivity measuring devices.

In traditional test separators, the full flow of the production stream flows through a test separator that includes a vessel in which the oil and water tend to separate. Gas is taken off from the top of the vessel and water from the bottom, while oil is removed from a level above the oil/water interface in the vessel. Individual measurements are taken of the flow of gas, water and oil to indicate the relative proportions of these components in the oil stream.

A large separator vessel is required and both the capital and operating costs of the equipment tend to be high. Also, in practice, the measurements derived from prior art test separators are subject to many errors.

An object of the present invention is to provide a method and apparatus for determining the water content of an oil stream that offers lower capital and operating costs and improved accuracy of measurement.

SUMMARY OF THE INVENTION

In one aspect of the invention, a method of determining the water content of an oil stream is provided, in which the mass flow of the oil stream is measured at a first location while the stream is under backpressure. At a second location downstream from the first location, a known sample portion is diverted from the oil stream. Water is separated from the sample portion and the proportion of water in the sample is measured. The sample is then returned to the oil stream at a location downstream from the second location. The water flow of the oil stream is calculated from the proportion of water in the sample and the known sample portion of the oil stream.

A corresponding apparatus for determining the water content of an oil stream is also provided.

By virtue of the fact that only a sample portion of the main oil stream is diverted, the capital and operating cost of the equipment can be reduced as compared with "full flow" equipment of the prior art. At the same time, the use of a mass flow meter in an oil stream that is under backpressure means that it is possible to obtain a very accurate measurement of the amount of material flowing in the oil stream. Maintaining the stream under backpressure preserves the flow regime of the oil stream. Since the proportion of the stream that is diverted as a sample is known, and since it is possible to accurately measure the proportion of water to oil in the sample, the total amount of water in the stream itself can be calculated.

Preferably, the sample stream is in fact separated into three "cuts", namely water, oil and gas, and the volume of each cut is measured accurately so that the proportion of all three components in the oil stream can be calculated accurately.

BRIEF DESCRIPTION OF DRAWINGS

In order that the invention may be more clearly understood, reference will now be made to the accompanying drawings which illustrate a number of preferred embodiments of the invention by way of example, and in which.

DESCRIPTION OF PREFERRED EMBODIMENTS

Figure 1:
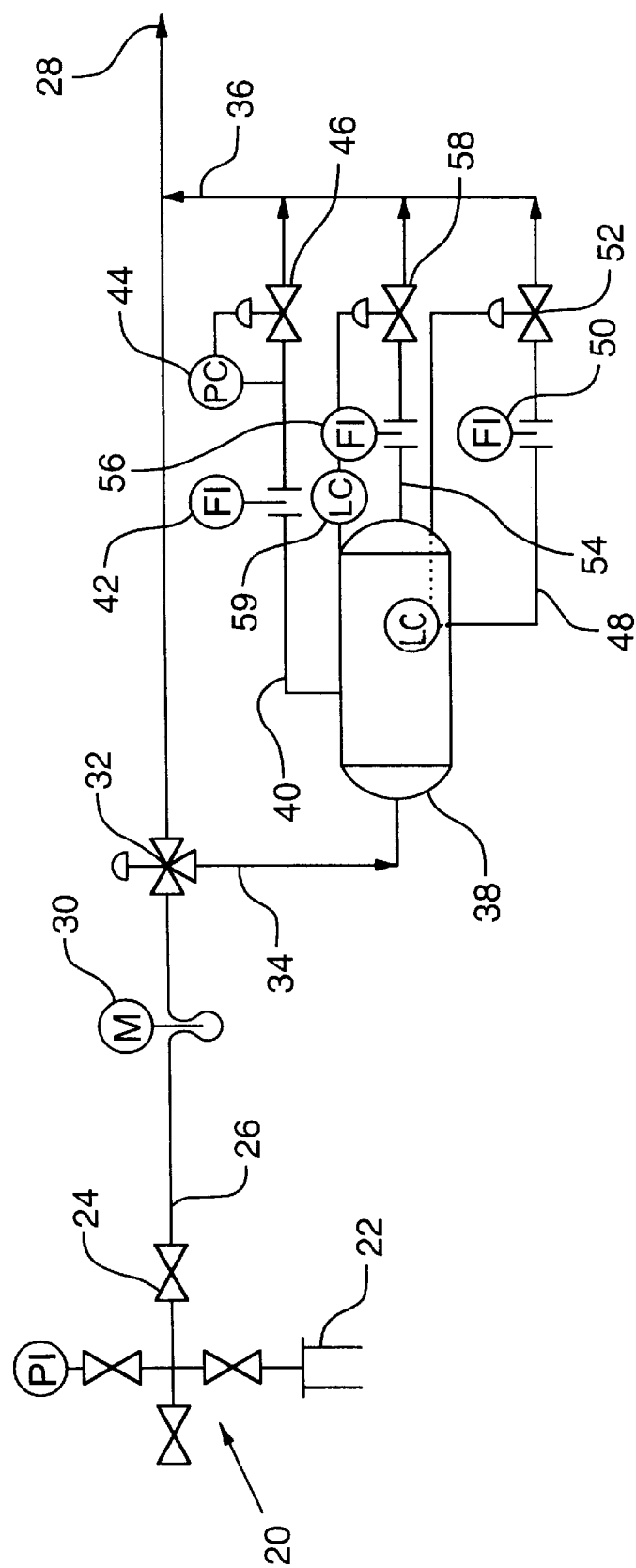
FIGS. 1 to 4 are schematic flow diagrams illustrating four alternative embodiments.

In each of FIGS. 1 to 4, reference numeral 20 denotes a conventional so-called "Christmas tree" valve interconnection having an input line 22 from one or more oil wells. An output valve is denoted 24 and is coupled to a line 26 to a production system indicated at 28 for receiving an oil stream through line 26.

In accordance with the invention, a mass flow meter 30 is provided in line 26 at a first location downstream from the Christmas tree 20. Meter 30 provides readings of, for example, Kg/sec. At a second location downstream from mass flow meter 30 is a diverter valve 32 that both provides backpressure to the oil stream flowing through meter 30 and diverts a known sample portion of the main oil stream into a side stream line 34. For example, the sample portion may comprise 0.1 to 90% by volume of the oil stream flowing in line 26. As noted previously, the backpressure provided by valve 32 helps to maintain the correct flow regime, thereby increasing the accuracy of measurement by meter 30.

The four embodiments illustrated show various ways of separating water from the side stream sample in line 34 and measuring the proportion of water in the sample before the sample is returned to the main line 26 through a return line 36.

Referring now specifically to FIG. 1, the side stream sample in line 34 is delivered first to a separator vessel 38 in which the oil in the sample tends to separate from and float on the surface of the water. Gas liberated from the sample is taken off overhead and flows through a line 40 to a flow indicator (FI) 42 that measures the flow volume of the gas (e.g. litres/sec). The gas sample then passes to a pressure controller (PC) 44 which controls the backpressure in the gas line 40 by way of a valve 46. Gas line 40 then joins the return line 36.

Water is taken off from the bottom of a vessel 38 through a line 48 and flows to a further flow indicator (FI) 50 which measures the volume of the water flow. Downstream of flow indicator 50 is a control valve 52 that is operated by an interface level indicator (ILC) 54 within vessel 38 responsive to the level of the interface between the oil and the water in the vessel. The valve is operated to maintain the interface at a desired level above the vessel outlet to line 48 and below a further outlet at an intermediate level to a line 54 though which oil is withdrawn from vessel 38. A further flow indicator (FI) 56 is provided in line 54 to measure the volume of the oil flowing in the line. Downstream of that flow indicator (56) is a further control valve 58 that responds to a level indicator (LC) 59 responsive to the overall level of liquid in vessel 38. Valve 58 is operated to maintain the overall liquid level above the level of the outlet to oil line 54. Both the oil line 54 and the water line 48 connect into the return line 36.

The indications provided by the three flow indicators 42, 50 and 56 represent the relative proportions of gas, water and oil in the side stream sample in line 34 and, consequently, the relative proportions of those components in the main oil stream in line 26. Since the mass flow in that line is known from meter 30 and the proportion of oil diverted into the side stream line 34 is known, it is possible to calculate the mass of oil, water and gas in the main oil stream in line 26.

Any sand in the oil stream will of course settle and be withdrawn with the water through line 48.

Figure 2:
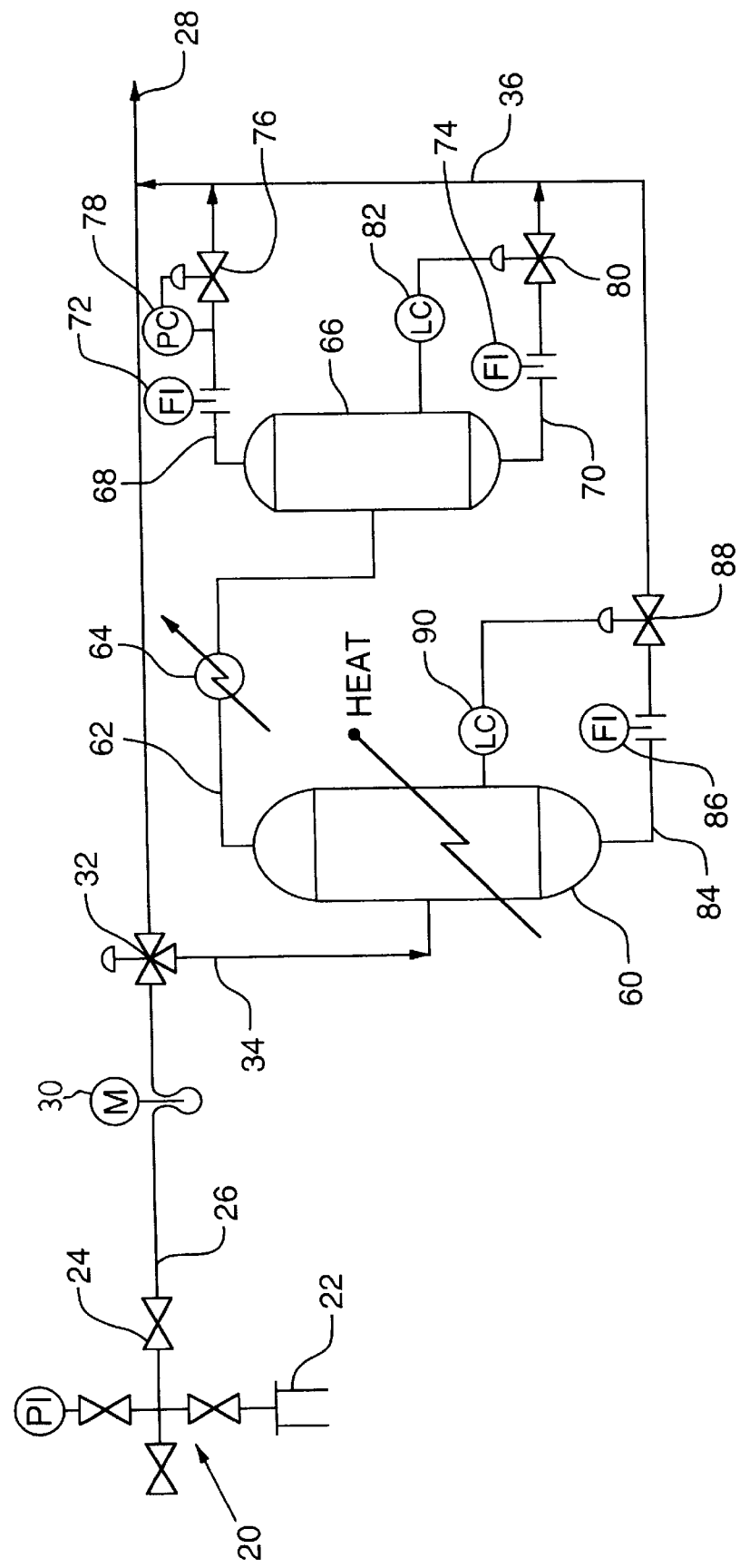

FIG. 2 shows an embodiment of the invention which is particularly suitable for oils which are difficult to separate. In this case, the side stream sample in line 34 is delivered to an evaporator 60 which adds heat to the sample and causes water to be flashed off with gas into an overhead line 62. A heat exchanger 64 in line 62 condenses the water which flows with the gas into a separator 66. The gas is taken off through an overhead line 68 while the water leaves through a bottom line 70. Respective flow indicators (FI) 72 and 74 in the lines 68 and 70 measure the flow volume of gas and water respectively. A valve 76 in line 68 is controlled by a pressure controller (PC) 78 to maintain a desired backpressure in line 68. A control valve 80 in line 70 is operated by a level controller 82 that responds to the water level in vessel 66 to maintain the body of water in the vessel.

Oil in the side stream in line 34 leaves the bottom of the heat exchanger 60 through a line 84 and its flow is measured by a flow indicator (FI) 86. A further control valve 88 maintains an appropriate oil level in evaporator 60 under the control of a level controller 90. Again, all three sample streams join to return line 36.

Figure 3:
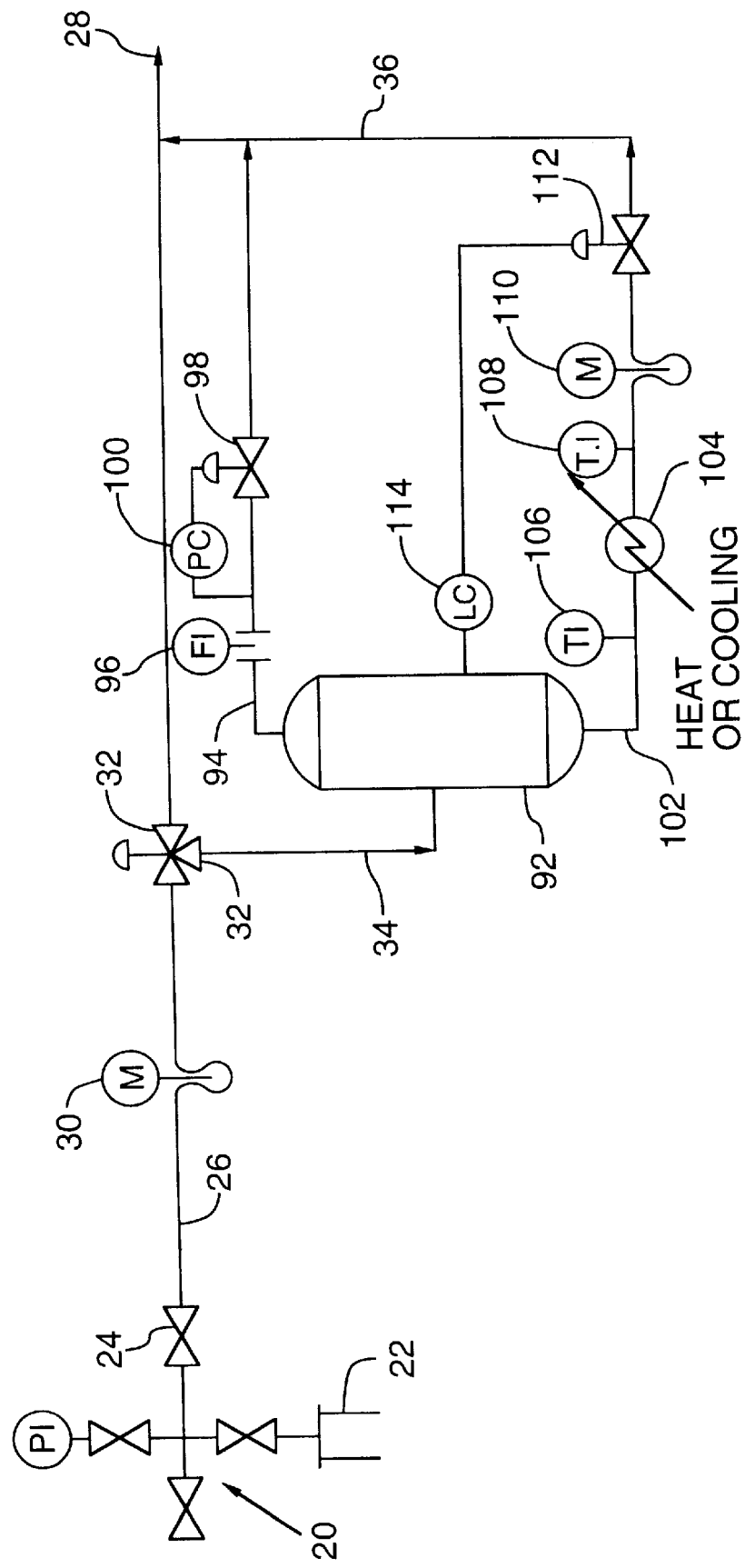
Figure 4:
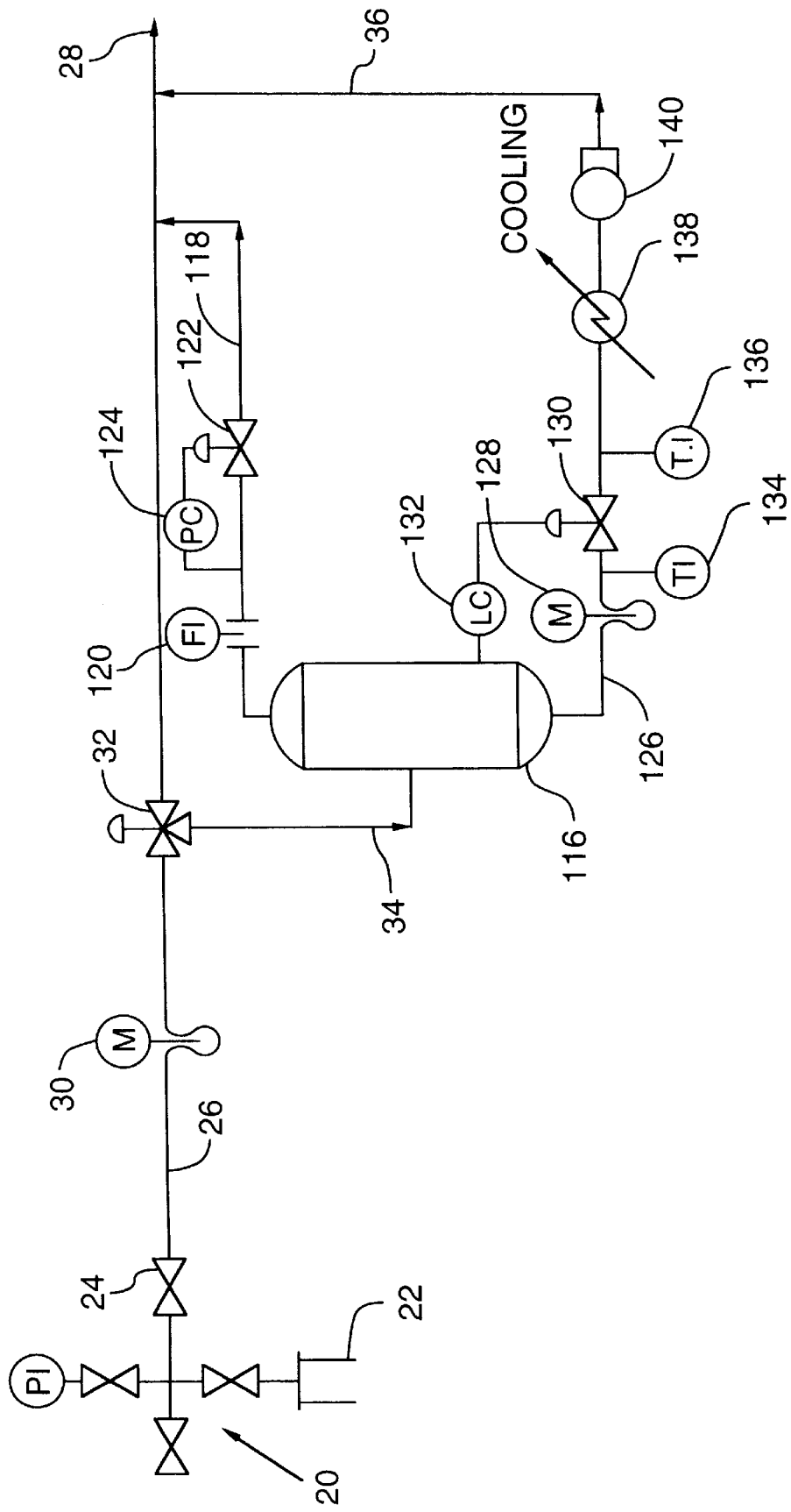

FIGS. 3 and 4 show embodiments in which alternative methods are used to measure the water content in a sample. In FIG. 3, the sample in line 34 is delivered to a separator vessel 92. Gas is taken off overhead in the same fashion as in the previous embodiments, through a line 94. Again, the line includes a flow indicator (FI) 96 and a valve 98 controlled by a pressure controller 100. Oil and water leave the bottom of vessel 92 through a line 102 that includes a heat exchanger 104 (heater or cooler) having associated upstream and downstream temperature sensors 106 and 108.

A mass flow meter 110 is provided downstream from the second temperature sensor 108 and is followed by a valve 112 that is controlled by a level controller (LC) 114 responsive to the level of liquid in vessel 92.

The temperature of the stream in line 102 is measured upstream and downstream of the heat exchanger 104. Together with the mass flow measured by meter 110, data is obtained to indicate the specific heat of the mixture of oil and water and allow the oil and water content of the stream to be calculated.

In FIG. 4, the side stream sample enters a vessel 116 and gas is removed through an overhead line 118 that includes a flow indicator (FI) 120 and a valve 122 controlled by a pressure controller 124 as in the previous embodiment.

Oil and water are taken off in a bottom line 126 that includes a mass flow meter 128 followed by a valve 130 that controls the liquid level in vessel 116 through a level controller (LC) 132. Upstream and downstream temperature sensors 134 and 136 respectively are provided on opposite sides of valve 138.

As the liquid passes through valve 130, the water vaporizes. The temperature drop across the valve is a function of the water content. The water is then condensed by a heat exchanger 138 before entering return line 36. A pump 140 is shown in line 126 (appropriate pumps may of course be provided where needed in all of the embodiments).

The embodiment of FIG. 4 has the advantage that a system failure is indicated if the temperature downstream of valve 130 (measured by sensor 136) is less than the saturation temperature of the water. This shows that all of the water did not evaporate and that some is measured as oil.

With the exception of meter 30, which must be a mass flow meter, measuring devices different from those specifically mentioned may be used in the embodiments of FIGS. 1 to 4. For example, mass flow meters could be used throughout, or capacitance or conductivity measurement could be used. Where volume flow is measured, appropriate temperature and pressure compensation should be applied, as is well-known in the art. Whatever measurement method is used, the measuring devices themselves are conventional.

In all of the embodiments, the side stream sampling system provided by the invention allows determination of water content at less capital and operating cost than prior art systems while at the same time providing a more reliable measurement of the water content of the main oil stream.

It will of course be appreciated that other alternatives than those specifically indicated above may be adopted within the broad scope of the invention and that the preceding description relates to particular preferred embodiments only. For example, while continuous flow sidestream sampling has been described, full stream batch sampling could be employed. A ball valve could be used to divert a "slug" of known volume from the main oil stream to line 34. Relatively short sampling frequencies would be used (e.g. 0.01 seconds to 60 minutes).

In the illustrated embodiments, the diverter valve 32 provides backpressure to the flow of oil along line 26. However, in an alternative embodiment, the backpressure could be provided by other means, for example, by appropriately sizing the line downstream of the flow meter, or providing some other form of restrictor in the line.

It should also be noted that, while in the illustrated embodiments, the oil stream is described as a three or four phase stream comprising oil, water, gas, and possibly sand, in some applications, there may be very little gas or the gas may be disregarded for practical purposes.

We claim:

1. A method of determining the water content of an oil stream, comprising the steps of:

measuring the mass flow of the oil stream at a first location while the stream is under backpressure;

diverting from the stream at a second location downstream of the first location, a known sample portion of the stream;

separating water from the sample and measuring the water content of the sample;

returning the sample to the oil stream; and, calculating the water content of the oil stream from said water content of the sample and the known portion of the oil stream represented by the sample;

wherein the oil stream includes gas and wherein the step of separating water from the sample and measuring the proportion of the water in the sample is performed by delivering the sample to a vessel, heating the vessel to cause water and gas to evaporate, separating the water and gas, measuring the flow volume of gas and the flow volume of water, removing oil from a lower region of said vessel, measuring the flow volume of the oil, and comparing the measured flow volumes for water, oil and gas to determine the proportion of water in the sample.

2. A method as claimed in claim 1, wherein said step of diverting from the oil stream a known sample portion of the stream comprises diverting a full stream batch sample.

3. An apparatus for determining the water content and the gas content of an oil stream flowing in an oil line, comprising:

a mass flow meter at a first location in the oil line for determining the mass flow of the oil stream, the line providing backpressure to the meter;

valve means at a location downstream of the mass flow meter for diverting from the oil stream, a known sample portion of the oil stream;

means for separating water and gas from the sample and measuring the proportion of water in the sample; and, means for subsequently returning the sample to the oil line at a location downstream of said second location;

wherein said separating means includes a vessel, means for heating the vessel to cause water and gas to evaporate, means for separating the water and gas, means for measuring the flow volume of gas and means for measuring the flow volume of water, the vessel having oil outlet means in a lower region including means for measuring the flow volume of the oil.

4. An apparatus as claimed in claim 3, wherein said valve means is adapted to divert the full flow of said oil stream on a batch basis for performing full stream batch sampling.

* * * * *